(12) United States Patent
Yun et al.

(10) Patent No.: US 9,866,814 B2
(45) Date of Patent: Jan. 9, 2018

(54) METHOD OF SYNCHRONIZING REFERENCE IMAGE WITH ADDITIONAL IMAGE OF REAL-TIME BROADCASTING PROGRAM, AND TRANSCEIVER SYSTEM FOR PERFORMING SAME

(75) Inventors: Kug Jin Yun, Daejeon-si (KR); Gwang Soon Lee, Daejeon-si (KR); Hyoung Jin Kwon, Chungbuk (KR); Hyun Jeong Yim, Seoul (KR); Kwang Hee Jung, Gyeonggi-do (KR); Won Sik Cheong, Daejeon-si (KR); Nam Ho Hur, Daejeon-si (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 443 days.

(21) Appl. No.: 13/979,799

(22) PCT Filed: Jan. 26, 2012

(86) PCT No.: PCT/KR2012/000620
§ 371 (c)(1),
(2), (4) Date: Jul. 15, 2013

(87) PCT Pub. No.: WO2012/102563
PCT Pub. Date: Aug. 2, 2012

(65) Prior Publication Data
US 2013/0300826 A1    Nov. 14, 2013

(30) Foreign Application Priority Data

Jan. 26, 2011   (KR) .................. 10-2011-0007574
Jan. 16, 2012   (KR) .................. 10-2012-0004990

(51) Int. Cl.
*H04N 13/00*  (2006.01)
*H04N 21/236*  (2011.01)

(52) U.S. Cl.
CPC ..... *H04N 13/0051* (2013.01); *H04N 13/0048* (2013.01); *H04N 13/0059* (2013.01); *H04N 13/0066* (2013.01); *H04N 21/236* (2013.01)

(58) Field of Classification Search
CPC ........... H04N 13/0048; H04N 13/0051; H04N 13/0059
See application file for complete search history.

(56) References Cited

U.S. PATENT DOCUMENTS

| 6,618,437 | B1* | 9/2003 | Yamamoto | H04N 13/0048 348/385.1 |
| 2003/0058262 | A1* | 3/2003 | Sato | G06F 3/147 345/690 |

(Continued)

FOREIGN PATENT DOCUMENTS

| KR | 1020090062216 A | 6/2009 |
| KR | 1020090102116 A | 9/2009 |

(Continued)

OTHER PUBLICATIONS

International Search Report dated Sep. 25, 2012; Appln. PCT/KR2012/000620.

*Primary Examiner* — Peter D Le
(74) *Attorney, Agent, or Firm* — Ladas & Parry LLP

(57) ABSTRACT

A method of synchronizing reference image with additional image in digital broadcasting includes generating at least one frame having predetermined identifier for providing notice of the start time of the reference image to receiver in advance; and transmitting at least one frame having the predetermined identifier to the receiver. Alternatively, the method of synchronizing reference image with additional image of includes generating signaling information contain- (Continued)

ing additional image interlocking information at a transmission side in order to prepare for the additional image interlocked with the reference image at a reception side in advance; and providing the signaling information to the receiver. Therefore, it is possible to accurately and effectively perform the synchronization of 3D reference image with 3D additional image stored in the receiver or a streamed 3D additional image.

3 Claims, 6 Drawing Sheets

(56) References Cited

U.S. PATENT DOCUMENTS

| | | | |
|---|---|---|---|
| 2005/0195334 A1* | 9/2005 | Yeh | H04N 21/44008 348/700 |
| 2007/0230456 A1* | 10/2007 | Kwon | H04H 20/18 370/389 |
| 2007/0247477 A1* | 10/2007 | Lowry | H04N 19/597 345/629 |
| 2008/0259212 A1* | 10/2008 | Fukumori | H04N 9/45 348/505 |
| 2010/0141738 A1* | 6/2010 | Lee | H04H 20/57 348/43 |
| 2011/0090306 A1* | 4/2011 | Suh | H04N 13/0029 348/42 |
| 2011/0099285 A1* | 4/2011 | Yamagishi | H04N 13/0059 709/231 |
| 2011/0188582 A1* | 8/2011 | Price | H04N 7/12 375/240.26 |

FOREIGN PATENT DOCUMENTS

| | | |
|---|---|---|
| KR | 1020100049873 A | 5/2010 |
| KR | 1020100050426 A | 5/2010 |
| KR | 1020100086440 A | 7/2010 |
| WO | 2010/147289 A1 | 12/2010 |

* cited by examiner

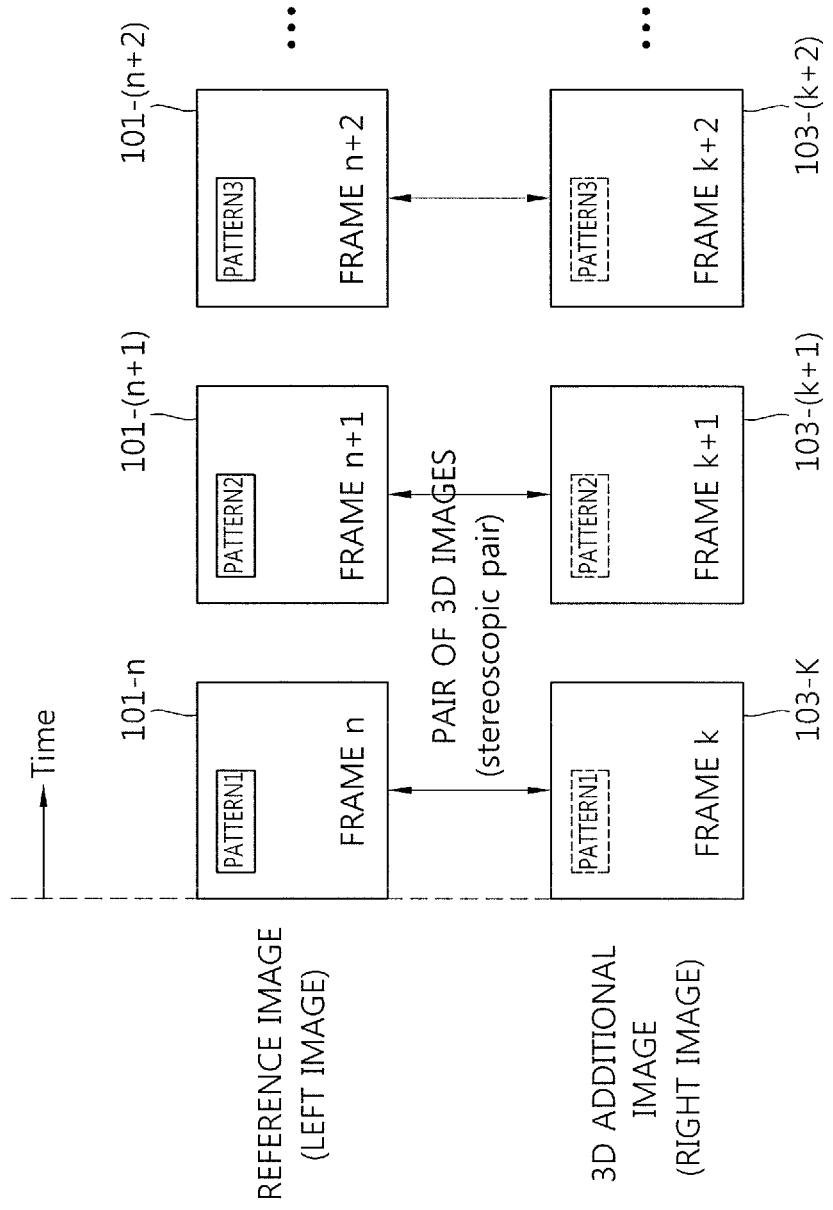

FIG. 2

| GRAMMAR | BIT NUMBER | CONSTRAINS |
|---|---|---|
| TS_program_map_section() { | | |
|   table_id | 8 | |
|   section_syntax_indicator | 1 | |
|   '0' | 1 | |
|   Reserved | 2 | |
|   section_length | 12 | |
|   program_number | 16 | |
|   Reserved | 2 | |
|   version_number   216 | 5 | |
|   current_next_indicator | 1 | |
|   section_number | 8 | |
|   last_section_number | 8 | |
|   Reserved | 3 | |
|   PCR_PID | 13 | |
|   Reserved | 4 | |
|   program_info_length | 12 | |
|   for (i=0; i<N; i++) { | | |
|       Stereoscopic_program_info_descritpor() | | 0×35 |
|   } | | |
|   for (i=0; i<N1; i++) { | | |
|     stream_type | 8 | 0×02 |
|     Reserved | 8 | |
|     elementary_PID | 13 | |
|     Reserved | 4 | |
|     ES_info_length | 12 | |
|     for (i=0; i<N2; i++) { | | |
|   stereoscopic_descriptor   220 | | 0×34 |
|     } | | |
|   } | | |
|   CRC_32 | 32 | |
| } | | |

FIG. 3

| GRAMMAR | BIT NUMBER | CONSTRAINS |
|---|---|---|
| TS_program_map_section() { | | |
|   table_id | 8 | |
|   section_syntax_indicator | 1 | |
|   '0' | 1 | |
|   Reserved | 2 | |
|   section_length | 12 | |
|   program_number | 16 | |
|   Reserved | 2 | |
|   version_number  310 | 5 | |
|   current_next_indicator | 1 | |
|   section_number | 8 | |
|   last_section_number | 8 | |
|   Reserved | 3 | |
|   PCR_PID | 13 | |
|   Reserved | 4 | |
|   program_info_length | 12 | |
|   for (i=0; i<N; i++) { | | |
|     Stereoscopic_program_info_descritpor() | | 0×35 |
|   } | | |
|   for (i=0; i<N1; i++) { | | |
|     stream_type | 8 | 0×02 |
|     Reserved | 3 | |
|     elementary_PID | 13 | |
|     stream_type  322 | 8 | |
|     elementary_PID  324 | 13 | |
|     Reserved | 4 | |
|     ES_info_length | 12 | |
|     for (i=0; i<N2; i++) [ | | |
|     MPEG2_stereoscopic_video_format_descriptor | | 0×34 |
|     } | | |
|   } | | |
|   CRC_32 | 32 | |
| } | | |

FIG. 4

| SYNTAX | BIT NUMBER | FORMAT |
|---|---|---|
| terrestrial_virtual_channel_table_section() { | | |
|   table_id | 8 | 0×CB |
|   section_syntax_indicator | 1 | '1' |
|   private_indicator | 1 | '1' |
|   reserved | 2 | '11' |
|   section_length | 12 | uimsbf |
|   transport_stream_id | 16 | uimsbf |
|   reserved | 2 | '11' |
|   version_number   410 | 5 | uimsbf |
|   current_indicator | 1 | bslbf |
|   section_number | 8 | uimsbf |
|   last_section_number | 8 | uimsbf |
|   protocol_version | 8 | uimsbf |
|   num_channels_in_section | 8 | uimsbf |
|   for(i=0; i<num_channel_in_section;i++) { | | |
|     short_name | 7*16 | unicode BMP |
|     reserved | 4 | '1111' |
|     major_channel_number | 10 | uimsbf |
|     minor_channel_number | 10 | uimsbf |
|     modulation_mode | 8 | uimsbf |
|     carrier_frequency | 32 | uimsbf |
|     channel_TSID | 16 | uimsbf |
|     program_number | 16 | uimsbf |
|     ETM_location | 2 | bslbf |
|     access_controlled | 1 | bslbf |
|     hidden | 1 | bslbf |
|     reserved | 2 | '11' |
|     hide_guide | 1 | bslbf |
|     reserved | 3 | '111' |
|     service_type | 6 | uimsbf |
|     source_id | 16 | uimsbf |
|     reserved | 6 | '111111' |
|     descriptors_length | 10 | uimsbf |
|     for (i=0;i<N;i++) {  420 | | |
|       descriptor() | | |

FIG. 5

| SYNTAX | BIT NUMBER | FORMAT |
|---|---|---|
| event_information_table_section() { | | |
|   table_id | 8 | 0×CB |
|   section_syntax_indicator | 1 | '1' |
|   private_indicator | 1 | '1' |
|   reserved | 2 | '11' |
|   section_length | 12 | uimsbf |
|   source_id | 16 | uimsbf |
|   zero | 2 | '00' |
|   version_number    510 | 5 | uimsbf |
|   current_next_indicator | 1 | '1' |
|   section_number | 8 | uimsbf |
|   last_section_number | 8 | uimsbf |
|   protocol_version | 8 | uimsbf |
|   num_events_in_section | 8 | uimsbf |
|   for(j=0; j<num_events_in_section;j++) { | | |
|     reserved | 2 | '11' |
|     event_id | 14 | uimsbf |
|     start_time | 32 | uimsbf |
|     reserved | 2 | '11' |
|     ETM_location | 2 | bslbf |
|     lenght_in_seconds | 20 | uimsbf |
|     title_length | 8 | uimsbf |
|     title_text() | var | |
|     reserved | 4 | '1111' |
|     descriptors_length | 12 | |
|     for (i=0;i<N;i++) { | | |
|     descriptor()   520 | | |
|     } | | |
|   } | | |
|   CRC_32 | | |
| } | 32 | rpchof |

METHOD OF SYNCHRONIZING
REFERENCE IMAGE WITH ADDITIONAL
IMAGE OF REAL-TIME BROADCASTING
PROGRAM, AND TRANSCEIVER SYSTEM
FOR PERFORMING SAME

TECHNICAL FIELD

The present invention relates to a synchronizing method, and more particularly, to a method of synchronizing a reference image and an additional image of a real-time 3-dimensional (3D) broadcasting program with each other and a transceiver system performing the same.

BACKGROUND ART

A program linked stereoscopic video service is a service in which a 3D additional image (or file) is transmitted to or stored in a receiver in advance or stored in a separate device, for example, an universal serial but bus (USB) device, or the like, and a reference image is transmitted using an existing digital broadcasting platform, such that the reference image and the 3D additional image stored in the receiver in advance are linked to and synchronized with each other, thereby providing a 3D stereoscopic image.

In Korean Patent Application No. 2010-0005984 (entitled "Method for Processing Non-real time Stereoscopic Services in Terrestrial Digital Multimedia Broadcasting and Apparatus for Receiving Terrestrial Digital Multimedia Broadcasting"), an SS_descriptor is additionally defined in a program map table (PMT) (the SS_descriptor is included in a descriptor loop immediately after a program_info_length in the PMT), and an NRT_marker for signaling a start position (a first frame position) is put in the SS_descriptor in order to synchronize 3D left and right images with each other. That is, a position of a start frame of a 3D broadcasting program is signaled using the SS_descriptor in the PMT.

In this case, a start of the 3D broadcasting program may be identified in a receiver side; however, whether an additional image frame of a 3D real-time broadcasting program starts after 0.5 second, starts after one second, or starts after three seconds based on a reference image of the 3D real-time broadcasting program may not be recognized at all in the receiver side, such that an additional image may not be read from a memory of the receiver in advance for the purpose of preparation.

As resolution of an image becomes high, more contents are stored in the memory of the receiver side, and thus it takes a long time to load and decode the contents stored in the memory.

In Korean Patent Application No. 2010-0005984, in the case in which a plurality of 3D additional images are stored in the receiver, since it is impossible to inform the receiver side of 3D additional image linked information linked to the reference image of the real-time broadcasting program through signaling in advance, the time that is required for the receiver to prepare the 3D additional image linked to the 3D reference image of the real-time broadcasting program in advance may not be provided, such that it takes a long time to load and decode the contents stored in the receiver side memory.

DISCLOSURE

Technical Problem

A first object of the present invention is to provide a method of synchronizing a reference image and an additional image of a real-time broadcasting program with each other for informing a receiver of a start time point of the reference image for a program linked stereoscopic video service.

A second object of the present invention is to provide a broadcasting transmitting system performing the method of synchronizing a reference image and an additional image of a real-time broadcasting program with each other.

A third object of the present invention is to provide a broadcasting receiver performing the method of synchronizing a reference image and an additional image of a real-time broadcasting program with each other.

Technical Solution

In an aspect for accomplishing the object of the present invention, a method of synchronizing a reference image and an additional image of a real-time broadcasting program with each other is provided. The method includes: generating at least one frame including a predetermined identifier for informing a receiver of a start time point of the reference image; and providing the at least one frame including the predetermined identifier to a receiving side. The at least one frame including the predetermined identifier may be a black pattern frame. The black pattern frame may be transmitted in advance before transmission of a reference image frame. The at least one frame including the predetermined identifier may be a reference image frame. The identifier may be at least one of a predetermined recognition marker and a predetermined pattern for informing the start time point of the reference image. The predetermined pattern may be a pattern formed of a combination of recognizable pixels at a predetermined position in the frame including the identifier. The predetermined pattern may be included in the frame such that a predetermined number of pixel patterns may be dispersed and included in a plurality of frames. A most significant bit (MSB) value of a pixel value in the frame may be used as the predetermined pattern. The predetermined pattern may be formed of an arrangement of bit values, and forward error correction may be applied to the arrangement of bit values. The identifier may be inserted into at least one frame at an intermediate any time point of a program linked service.

In another aspect for accomplishing the first object of the present invention, a method of synchronizing a reference image and an additional image of a real-time broadcasting program with each other is provided. The method includes: generating, in a transmitting side, signaling information including additional image linked information so that a receiving side prepares the additional image linked to the reference image of the real-time broadcasting program; and providing the signaling information to a receiver. The additional image linked information may be included in a descriptor and then signaled to the receiver. The additional image linked information may be included in a descriptor in a program map table (PMT) and then signaled to the receiver. A value of a Current_next_indicator field in the program map table (PMT) may be set to a predetermined value and then signaled to the receiver so that the receiver prepares an additional image stored in a memory of the receiver or a streamed additional image. The additional image linked information may be included in a descriptor in a program and system information protocol (PSIP) table and then signaled to the receiver. The additional image linked information may be included in at least one of a terrestrial virtual channel table (TVCT) and an event information table (EIT) of PSIP and then signaled to the receiver. The additional image linked information may be included in a metadata stream and then signaled to the receiver.

In still another aspect for accomplishing the second object of the present invention, a broadcasting transmitting system performing synchronization between a reference image and an additional image of a real-time broadcasting program, the broadcasting transmitting system including: a transmitting server configured to generate at least one frame including a predetermined identifier for informing a receiver of a start time point of a reference image in advance; a reference image encoder configured to encode the reference image in real time; and an additional image encoder configured to encode the additional image. The identifier may be at least one of a predetermined recognition marker and a predetermined pattern for informing the start time point of the reference image. The predetermined pattern may be included in the frame such that a predetermined number of pixel patterns may be dispersed and included in a plurality of frames.

In still another aspect for accomplishing the second object of the present invention, a broadcasting transmitting system performing synchronization between a reference image and an additional image of a real-time broadcasting program is provided. The broadcasting transmitting system includes: a signaling information encoder configured to generate signaling information including additional image linked information so that a receiving side prepares the additional image linked to the reference image of the real-time broadcasting program; a reference image encoder configured to encode the reference image in real time; an additional image encoder configured to encode the additional image; and a multiplexer configured to multiplex at least one of the reference image and the additional image and the signaling information. The additional image linked information may be included in a descriptor and then signaled to the receiver.

In still another aspect for accomplishing the third object of the present invention, a broadcasting receiver performing synchronization between a reference image and an additional image of a real-time broadcasting program is provided. The broadcasting receiver includes: a reference image decoder configured to decode the reference image; an additional image decoder configured to decode the additional image; and a synchronization reproducing unit configured to recognize a start time point of the reference image based on a predetermined identifier included in a received frame to control reproduction time points of the reference image and the additional image so that the additional image is reproduced in a state in which the additional image is synchronized with the start time point of the reference image. The broadcasting receiver may further include a memory that stores a 3D additional image transmitted from a broadcasting transmitting system therein.

In still another aspect for accomplishing the third object of the present invention, a broadcasting receiver performing synchronization between a reference image and an additional image of a real-time broadcasting program is provided. The broadcasting receiver includes: a reference image decoder configured to decode the reference image; an additional image decoder configured to decode the additional image; and a synchronization reproducing unit configured to control reproduction time points of the reference image and the additional image based on signaling information including additional image linked information so that the additional image is reproduced in a state in which the additional image is synchronized with a start time point of the reference image. The broadcasting receiver may further include a memory that stores a 3D additional image transmitted from a broadcasting transmitting system therein.

Advantageous Effects

According to the method of synchronizing the reference image and the additional image of the real-time broadcasting program with each other and the broadcasting transmitting system performing the same according to the exemplary embodiments of the present invention, a predetermined identifier—for example, a predetermined recognition marker or a predetermined pattern—is inserted into a frame and the frame including the predetermined identifier is provided to a receiving side to inform the receiving side of a start time point of the reference image, thereby making it possible to inform the receiving side of the start time point of the reference image while minimizing a change in a digital broadcasting transmitting system, and the receiving side recognizes the predetermined identifier in a decoded image, thereby making it possible to efficiently perform accurate synchronization between a 3D reference image of a real-time broadcasting program and a 3D additional image stored in a receiver or a streamed additional image.

In addition, a transmitting side signals additional image linked information to a receiving side to allow the receiving side to prepare an additional image linked to a reference image of a real-time broadcasting program, thereby making it possible to allow the receiving side to efficiently perform accurate synchronization between a 3D reference image of the real-time broadcasting program and a 3D additional image stored in a receiver or a streamed additional image. That is, it is possible to perform synchronization between a reference image and an additional image in a content level with respect to a stereoscopic video obtained from a camera or an image obtaining device.

DESCRIPTION OF DRAWINGS

FIG. 1 is a conceptual diagram for describing a method of informing a start time point of a reference image using a frame including a predetermined identifier in order to synchronize the reference image and an additional image with each other according to an exemplary embodiment of the present invention.

FIG. 2 shows a structure of a program map table (PMT) for describing a method of informing a start time point of a reference image by signaling additional image linked information to a receiving side using a descriptor in the PMT in order to synchronize the reference image and an additional image with each other according to another exemplary embodiment of the present invention.

FIG. 3 shows a structure of a PMT for describing a method of informing a start time point of a reference image by signaling additional image linked information to a receiving side using a metadata stream in order to synchronize the reference image and an additional image with each other according to still another exemplary embodiment of the present invention, wherein the metadata stream is allocated, multiplexed, and transmitted as a separate stream type.

FIG. 4 shows a structure of a terrestrial virtual channel table (TVCT) of a program and system information protocol (PSIP) for describing a method of informing a start time point of a reference image by signaling additional image linked information to a receiving side using a descriptor in the PSIP in order to synchronize the reference image and an additional image with each other according to still another exemplary embodiment of the present invention.

FIG. 5 shows a structure of an event information table (EIT) of a program and system information protocol (PSIP) for describing a method of informing a start time point of a reference image by signaling additional image linked information to a receiving side using a descriptor in the PSIP in order to synchronize the reference image and an additional image with each other according to still another exemplary embodiment of the present invention.

MODE FOR INVENTION

Figure 6:
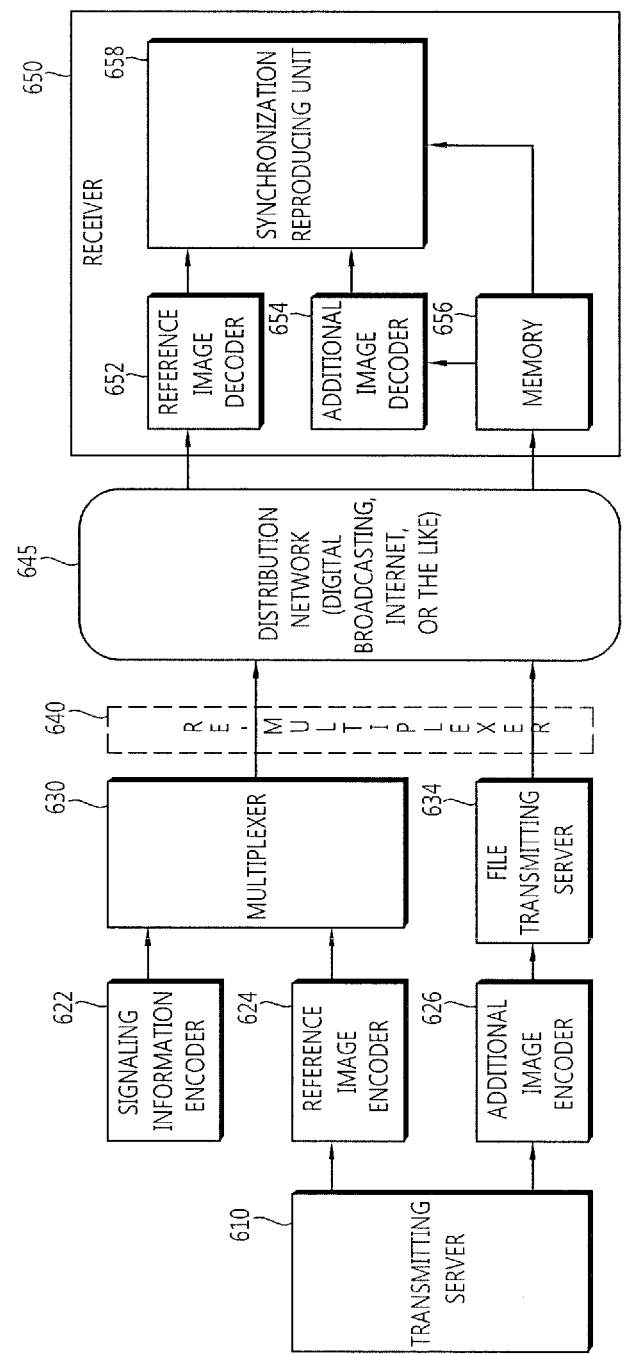
FIG. 6 is a block diagram for describing a structure of a broadcasting transceiver system performing synchronization between a reference image and an addition image of a real-time broadcasting program according to an exemplary embodiment of the present invention.

Since the present invention may be variously modified and have several exemplary embodiments, specific exemplary embodiments thereof will be shown in the accompanying drawings and be described in detail.

However, it is to be understood that the present invention is not limited to the specific exemplary embodiments, but includes all modifications, equivalents, and substitutions included in the spirit and the scope of the present invention.

Terms used in the specification, 'first', 'second', etc. can be used to describe various components, but the components are not to be construed as being limited to the terms. The terms are only used to differentiate one component from other components. For example, the 'first' component may be named the 'second' component and the 'second' component may also be similarly named the 'first' component, without departing from the scope of the present invention. A term 'and/or' includes a combination of a plurality of related described items or any one of the plurality of related described items.

It is to be understood that when one element is referred to as being "connected to" or "coupled to" another element, it may be connected directly to or coupled directly to another element or be connected to or coupled to another element, having the other element intervening therebetween. On the other hand, it is to be understood that when one element is referred to as being "connected directly to" or "coupled directly to" another element, it may be connected to or coupled to another element without the other element intervening therebetween.

Terms used in the present specification are used only in order to describe specific exemplary embodiments rather than limiting the present invention. Singular forms are intended to include plural forms unless the context clearly indicates otherwise. It will be further understood that the terms "comprises" or "have" used in this specification, specify the presence of stated features, steps, operations, components, parts, or a combination thereof, but do not preclude the presence or addition of one or more other features, numerals, steps, operations, components, parts, or a combination thereof.

Unless indicated otherwise, it is to be understood that all the terms used in the specification including technical and scientific terms has the same meaning as those that are understood by those who skilled in the art. It must be understood that the terms defined by the dictionary are identical with the meanings within the context of the related art, and they should not be ideally or excessively formally defined unless the context clearly dictates otherwise.

Stereoscopic is a feature allowing a user to feel stereoscopic feeling using data of left and right binocular views of a person and is used as the same meaning as 3D. In addition, the stereoscopic may include a case of a multi-view allowing the user to feel the stereoscopic feeling using data of two or more views by two or more cameras.

A reference image means an image compatibly recognized and reproduced by the broadcasting receiving device according to the related art in a stereoscopic image or an image reproduced at the time of changing a viewing mode from a stereoscopic mode into a monoscopic mode. For example, the reference image may be a left image (or a right image) of the 3D image.

An additional image means an image of a view different from that of the reference image in the stereoscopic image. For example, the reference image may be the right image (or the left image) of the 3D image.

Hereinafter, exemplary embodiments of the present invention will be described in more detail with reference to the accompanying drawings. In order to facilitate the general understanding of the present invention in describing the present invention, through the accompanying drawings, the same reference numerals will be used to describe the same components and an overlapped description of the same components will be omitted.

In order to provide a program linked stereoscopic video service according to an exemplary embodiment of the present invention, a synchronizing method in an accurate frame unit is required. That is, on the assumption that a 3D additional image (a stream or a file) is stored in a receiver in advance without a frame error, an accurate start time point of a reference image at which a program linked service starts in a transmitted real-time broadcasting program needs to be informed in a transmitter.

As a method of informing a start time point of a reference image at which a program linked service starts in a transmitter as described above, the present invention discloses two methods, that is, a method of using a frame including a predetermined identifier and a method of signaling additional image linked information to a receiving side.

Use of Frame Including Predetermined Identifier

FIG. 1 is a conceptual diagram for describing a method of informing a start time point of a reference image using a frame including a predetermined identifier in order to synchronize the reference image and an additional image with each other according to an exemplary embodiment of the present invention.

Referring to FIG. 1, in order to inform a start time point of a 3D reference image, a frame including a predetermined identifier is generated and provided to a receiving side.

More specifically, according to the exemplary embodiment of the present invention, in order to synchronize a reference image and an additional image in a source image with each other, the predetermined identifier is inserted into the frame.

Here, the frame into which the predetermined identifier is inserted may be a reference image frame when it is assumed that the additional image stored in a receiver in advance is stored without an error. Alternatively, the frame into which the predetermined identifier is inserted may also be a reference image frame and an additional image frame.

Alternatively, the frame into which the predetermined identifier is inserted may also be a black pattern frame. The black pattern frame is neither the reference image frame nor the additional image frame, but may be a frame transmitted in advance before transmission of the reference image frame. The number of black pattern frames may be, for example, three. However, the number of black pattern frames is not limited thereto, but may also be one, two, or four or more.

Here, the identifier inserted into the frame may be a predetermined recognition marker or a predetermined pattern for informing the start time point of the reference image.

The predetermined pattern may be a specific pattern in bits of a pixel in the frame into which the identifier is inserted. In the specific pattern, for example, a combination of recognizable pixels may be inserted into a specific position of an upper end or a lower end of the frame. Alternatively, in the specific pattern, a predetermined number of pixel patterns may be inserted into several frames in order to enhance resistance to an error during a process of encoding/decoding or transmitting an image. For example, as shown in FIG. 1, each of pattern 1, pattern 2, and pattern 3 may be sequentially inserted into frames n, n+1, and n+2. Here, all of the pattern 1, the pattern 2, and the pattern 3 may have the same pattern, the pattern 1, the pattern 2, and the pattern 3 may have the partially same pattern, or each of the pattern 1, the pattern 2, and the pattern 3 may have different patterns. Alternatively, in order to further enhance the resistance to the error, a most significant bit (MSB) value of a pixel value in the frame may be used as the pattern or a forward error correction method appropriate for arrangement of bit values for the pattern may be applied.

Alternatively, the identifier may be periodically inserted into at least one predetermined frame at an inter mediate time point of a program linked service as well as a start time point thereof, such that even in the case in which a user access a 3D broadcasting service at any time point, the reference image and the additional image may be synchronized with each other.

As described above, the frame including the predetermined identifier is provided to the receiving side, thereby making it possible to inform the receiving side of the start time point of the reference image while minimizing a change in a digital broadcasting transmitting system, and the receiving side recognizes the predetermined identifier in a decoded image, thereby making it possible to provide accurate synchronization between a 3D reference image of a real-time broadcasting program and a 3D additional image (a stream or a file) stored in the receiver in advance.

Signaling of Additional Image Linked Information to Receiving Side

The method of signaling an additional image linked information to a receiving side, which is a method for waking up the 3D additional image in the receiver, is a method of signaling the additional image linked information to the receiver so that the 3D additional image linked to the reference image of the real-time broadcasting program may be prepared in the receiver in advance.

That is, a plurality of 3D additional images are stored in a memory of the receiver, and the additional image linked information is signaled to the receiver to inform the receiver of the 3D additional image linked to the reference image of the real-time broadcasting program in advance as described above, thereby making it possible to provide a time at which the receiver may prepare a related 3D additional image. As a result, the 3D additional image and the reference image of the real-time broadcasting program are synchronized with each other, thereby making it possible to provide a 3D stereoscopic image to a viewer.

FIG. 2 shows a structure of a program map table (PMT) for describing a method of informing a start time point of a reference image by signaling additional image linked information to a receiving side using a descriptor in the PMT in order to synchronize the reference image and an additional image with each other according to another exemplary embodiment of the present invention.

The PMT, which is one of four tables pertaining to program specific information (PSI) of MPEG-2 TS, is inserted into a TS stream currently transmitted in real time and then transmitted. That is, the PMT is inserted into a TS stream of the reference image of the real-time broadcasting program and then transmitted.

Referring to FIG. 2, it is possible to inform the receiver side of a 3D additional image (a 3D additional image file) stored in a memory of the receiver side or a streamed additional image so that the receiver may prepare them in advance using a Current_next_indicator field 216 in the PMT and to signal additional image linked information to the receiver side using a stereoscopic_descriptor 220 in the PMT. Here, the Current_next_indicator 216 may be configured of 1 bit to have a value of '0' or '1'. The additional image linked information may include a name of an additional image and a uniform resource locator (URL) of the additional image.

More specifically, in the case in which the value of the Current_next_indicator 216 in the PMT is '1', a currently transmitted PMT is valid, and the PMT including the Current_next_indicator 216 having the value of '1' is currently applicable to a currently transmitted broadcasting program. Alternately, in the case in which the value of the Current_next_indicator 216 is '0', it means that the current PMT including the Current_next_indicator 216 having the value of '0' is not valid for a current program, and a PMT to be subsequently transmitted is valid. That is, when a PMT in which the value of the Current_next_indicator 216 is set to '0' is received, the receiver parses 3D additional image linked information in the PMT to allow the additional image to be prepared in advance, and when the value of the Current_next_indicator 216 in a periodically transmitted PMT is set to '1', the receiver parses the 3D additional image linked information in the PMT to synchronize a 3D additional image linked to a reference image of a current real-time broadcasting program with the reference image and perform loading and decoding in the memory of the receiver side, thereby allowing a 3D stereoscopic image to be provided to the viewer.

FIG. 3 shows a structure of a PMT for describing a method of informing a start time point of a reference image by signaling additional image linked information to a receiving side using metadata in order to synchronize the reference image and an additional image with each other according to still another exemplary embodiment of the present invention.

Referring to FIG. 3, it is possible to inform the receiver side of the 3D additional image stored in the memory of the receiver side or the streamed 3D additional image so that the receiver may prepare them in advance using a Current_next_indicator field 310 in the PMT and to allow the additional image linked information to be included in the metadata and then signal the additional image linked information to the receiver side. Here, stream_type 322 in the PMT is set to the metadata, and elementary_PID 324 therein is set to PID of a metadata elementary stream (ES), thereby making it possible to specify the metadata including the additional image linked information. Here, the Current_next_indicator 216 may be configured of 1 bit to have a value of '0' or '1'. The additional image linked information may include a name of an additional image and a uniform resource locator (URL) of the additional image.

More specifically, in the case in which the value of the Current_next_indicator 216 in the PMT is '1', a currently transmitted PMT is valid, and the PMT including the Current_next_indicator 216 having the value of '1' is currently applicable to a currently transmitted broadcasting program. Alternately, in the case in which the value of the Current_next_indicator 216 is '0', it means that the current PMT including the Current_next_indicator 216 having the value of '0' is not valid for a current program, and a PMT to be subsequently transmitted is valid. That is, when a PMT in which the value of the Current_next_indicator 216 is set to '0' is received, the receiver parses 3D additional image linked information in the PMT to allow the additional image to be prepared in advance, and when the value of the Current_next_indicator 216 in a periodically transmitted PMT is set to '1', the receiver parses the 3D additional image linked information in the PMT to synchronize a 3D additional image linked to a reference image of a current real-time broadcasting program with the reference image and perform loading and decoding in the memory of the receiver side, thereby allowing a 3D stereoscopic image to be provided to the viewer.

Meanwhile, the additional image linked information may be signaled to the receiving side using descriptors of program and system information protocol (PSIP) tables according to ATSC A/65C (program and system information protocol for terrestrial broadcast and cable (Revision C)) PSIP.

The PSIP provides channel information and broadcasting program guide information including broadcasting time information, and the receiver receives the PSIP in advance before broadcasting, thereby making it possible to confirm the broadcasting program guide information.

The PSIP tables include a master guide table (MGT), a terrestrial virtual channel table (TVCT), a cable virtual channel table (CVCT), an event information table (EIT), and the like.

FIG. 4 shows a structure of a terrestrial virtual channel table (TVCT) of a program and system information protocol (PSIP) for describing a method of informing a start time point of a reference image by signaling additional image linked information to a receiving side using a descriptor in the PSIP in order to synchronize the reference image and an additional image with each other according to still another exemplary embodiment of the present invention.

FIG. 4 shows the structure of the TVCT of the PSIP for describing a method of signaling the additional image linked information to the receiving side using the TVCT of the PSIP.

Referring to FIG. 4, the additional image linked information is signaled to the receiver side using the descriptor 420 of the TVCT of the PSIP, thereby making it possible to allow the receiver side to prepare the 3D additional image stored in the memory of the receiver side or the streamed 3D additional image in advance. That is, the additional image linked information is included in the descriptor 420 of the TVCT.

In the case of the PSIP, since the receiver may receive the PSIP in advance before broadcasting to confirm the broadcasting program guide information, the receiver may prepare the 3D additional image in advance before the broadcasting without using Current_next_indicator 410. Alternately, as described with reference to FIGS. 2 and 3, a value of the Current_next_indicator 410 is set to '1' or '0', thereby making it possible to the receiver to prepare the 3D additional image in advance.

FIG. 5 shows a structure of an event information table (EIT) of a program and system information protocol (PSIP) for describing a method of informing a start time point of a reference image by signaling additional image linked information to a receiving side using a descriptor in the PSIP in order to synchronize the reference image and an additional image with each other according to still another exemplary embodiment of the present invention.

FIG. 5 shows the structure of the EIT of the PSIP for describing a method of signaling the additional image linked information to the receiving side using the EIT of the PSIP.

Referring to FIG. 5, the additional image linked information is signaled to the receiver side using the descriptor 520 of the EIT of the PSIP, thereby making it possible to allow the receiver side to prepare the 3D additional image stored in the memory of the receiver side or the streamed 3D additional image in advance. That is, the additional image linked information is included in the descriptor 420 of the EIT.

In the case of the PSIP, since the receiver may receive the PSIP in advance before broadcasting to confirm the broadcasting program guide information, the receiver may prepare the 3D additional image in advance before the broadcasting without using Current_next_indicator 510. Alternatively, as described with reference to FIGS. 2 and 3, a value of the Current_next_indicator 510 is set to '1' or '0', thereby making it possible to the receiver to prepare the 3D additional image in advance.

FIG. 6 is a block diagram for describing a structure of a broadcasting transceiver system performing synchronization between a reference image and an addition image of a real-time broadcasting program according to an exemplary embodiment of the present invention.

Referring to FIG. 6, a transmitting system may include a transmitting server 610, a signaling information encoder 622, a reference image encoder 624, an additional image encoder 626, a stile transmitting server 634, a multiplexer 630, and a re-multiplexer 640.

The transmitting server 610 schedules reference image and additional image sources to transmit them to each encoder. The transmitting server 610 may serve to insert a predetermined identifier, for example, a predetermined recognition marker or a predetermined pattern into a frame as described above with reference to FIG. 1. That is, the transmitting server 610 may generate at least one frame including the predetermined identifier for informing a receiver of a start time point of a reference image in advance.

The signaling information encoder 622 generates signaling information including additional image linked information on a 3D additional image. The additional image linked information may be transmitted as the signaling information using the descriptor in the PMT, the descriptor in the PSIP table, or the metadata stream as described above.

The reference image encoder 624 encodes the reference image in real time, and the additional image encoder 626 encodes the 3D additional image in real time or non-real time.

The file transmitting server 634 transmits the additional image encoded in the additional image encoder 626 by a file transmitting method before the program linked service according to the embodiment of the present invention is practiced.

The multiplexer 630 multiplexes the reference image and the signaling information. Alternatively, the multiplexer 630 may also multiplex the reference image, the signaling information, and the additional image.

The re-multiplexer 630 re-multiplexes the reference image and the additional image in order to transmit them through a signal distribution network or a signal transmission channel. In the case in which each of the reference image and the additional image is transmitted through different distribution networks or different transmission channels, a re-multiplexing operation of the re-multiplexer 630 is not required.

Although FIG. 6 describes a case in which the additional image is transmitted as a file by way of example, the additional image may also be transmitted in a stream form.

Referring to FIG. 6, a receiver 650 may include a reference image decoder 652, an additional image decoder 654, a memory 656, and a synchronization reproducing unit 658.

The 3D additional image transmitted from the broadcasting transmitting system is stored in the memory 656 of the receiver 650.

The reference image decoder 652 decodes the reference image transmitted from the broadcasting transmitting system.

The additional image decoder 654 loads the additional image transmitted from the broadcasting transmitting system from the memory 656 and then decodes the loaded additional image. Alternatively, the additional image decoder 654 may also decode a streamed additional image.

The synchronization reproducing unit 658 recognizes the start time point of the reference image based on the predetermined identifier included in the received frame to control reproduction time points of the reference image and the additional image so that the additional image is reproduced in a state in which it is synchronized with the start time point of the reference image. More specifically, the synchronization reproducing unit 658 extracts the above-mentioned predetermined identifier, for example, the predetermined recognition marker or the predetermined pattern in the received frame to recognize the start time point of the reference image and then control an operation time point of the additional image decoder 654 and control reproduction time points of the reference image and the additional image so as to be suitable for a pair of 3D images (the reference image and the additional image).

In addition, the synchronization reproducing unit 658 controls the reproduction time points of the reference image and the additional image based on the signaling information including the additional image linked information so that the additional image is reproduced in a state in which it is synchronized with the start time point of the reference image. More specifically, the synchronization reproducing unit 658 extracts the above-mentioned signaling information including the additional image linked information and controls the operation time point of the additional image decoder 654 and controls the reproduction time points of the reference image and the additional image using the signaling information so that the additional image is reproduced in a state in which it is synchronized with the start time point of the reference image.

Hereinabove, although the present invention have been described with reference to the exemplary embodiments thereof, those skilled in the art will appreciate that various modifications, additions and substitutions are possible, without departing from the scope and spirit of the invention as disclosed in the accompanying claims.

The invention claimed is:

1. A method of synchronizing a reference image and an additional image in a digital broadcasting with each other, the method comprising:
    generating at least one frame including a predetermined identifier for informing a receiver of a start time point of the reference image in advance; and
    providing the at least one frame including the predetermined identifier to a receiving side,
    wherein the predetermined identifier includes a pattern for at least one pixel, and
    wherein the at least one frame including the predetermined identifier is stored in the reference image in advance,
    wherein, the predetermined identifier includes a most significant bit (MSB) values of a pixel value.

2. A broadcasting transmitting system performing synchronization between a reference image and an additional image of a real-time broadcasting program, the broadcasting transmitting system comprising:
    a transmitting server configured to generate at least one frame including a predetermined identifier for informing a receiver of a start time point of a reference image in advance;
    a reference image encoder configured to encode the reference image in real time; and
    an additional image encoder configured to encode the additional image,
    wherein the predetermined identifier includes a pattern for at least one pixel, and
    wherein the at least one frame including the predetermined identifier is stored in the reference image in advance,
    wherein the predetermined identifier includes a most significant bit (MSB) values of a pixel value.

3. A broadcasting receiver performing synchronization between a reference image and an additional image in a digital broadcasting, the broadcasting receiver comprising:
    a reference image decoder configured to decode the reference image;
    an additional image decoder configured to decode the additional image; and
    a synchronization reproducing unit configured to recognize a start time point of the reference image based on a predetermined identifier included in a received frame to control reproduction time points of the reference image and the additional image so that the additional image is reproduced in a state in which the additional image is synchronized with the start time point of the reference image,
    wherein the predetermined identifier includes a pattern for at least one pixel, and
    wherein the at least one frame including the predetermined identifier is stored in the reference image in advance,
    wherein the predetermined identifier includes a most significant bit (MSB) values of a pixel value.

* * * * *